Patented Dec. 2, 1924.

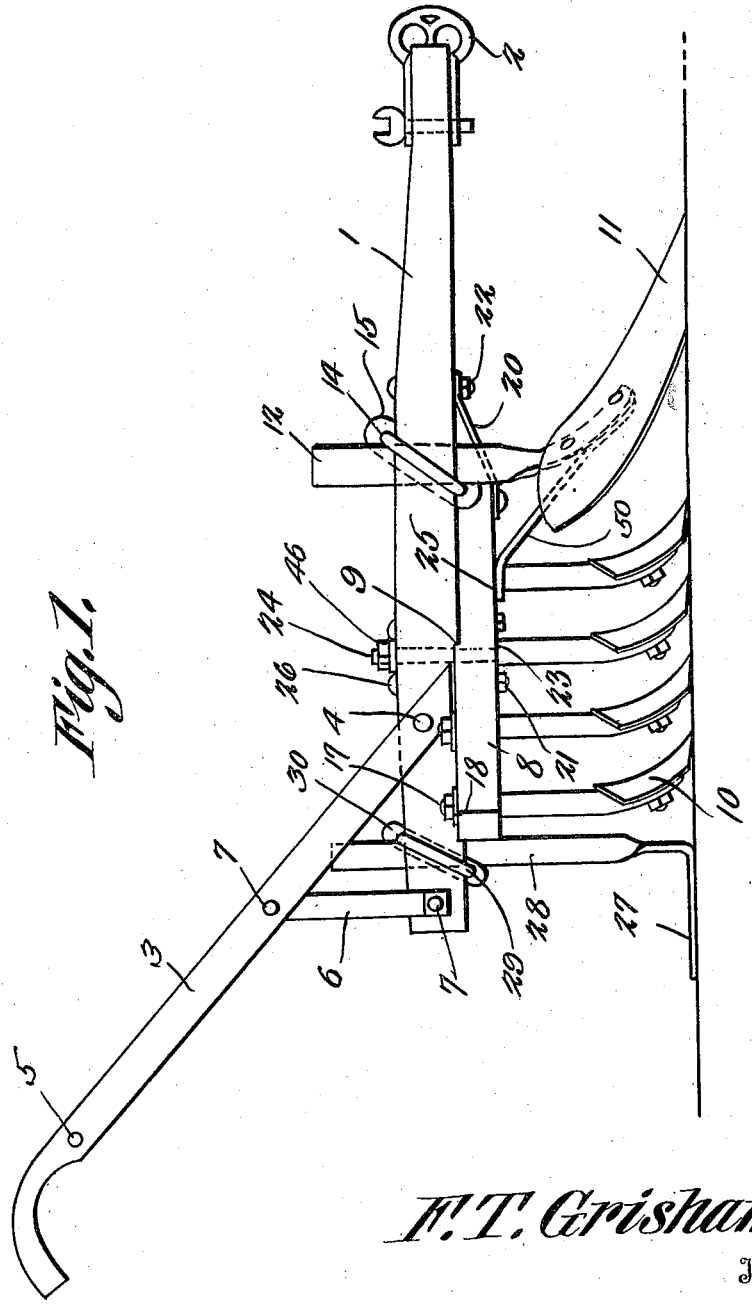

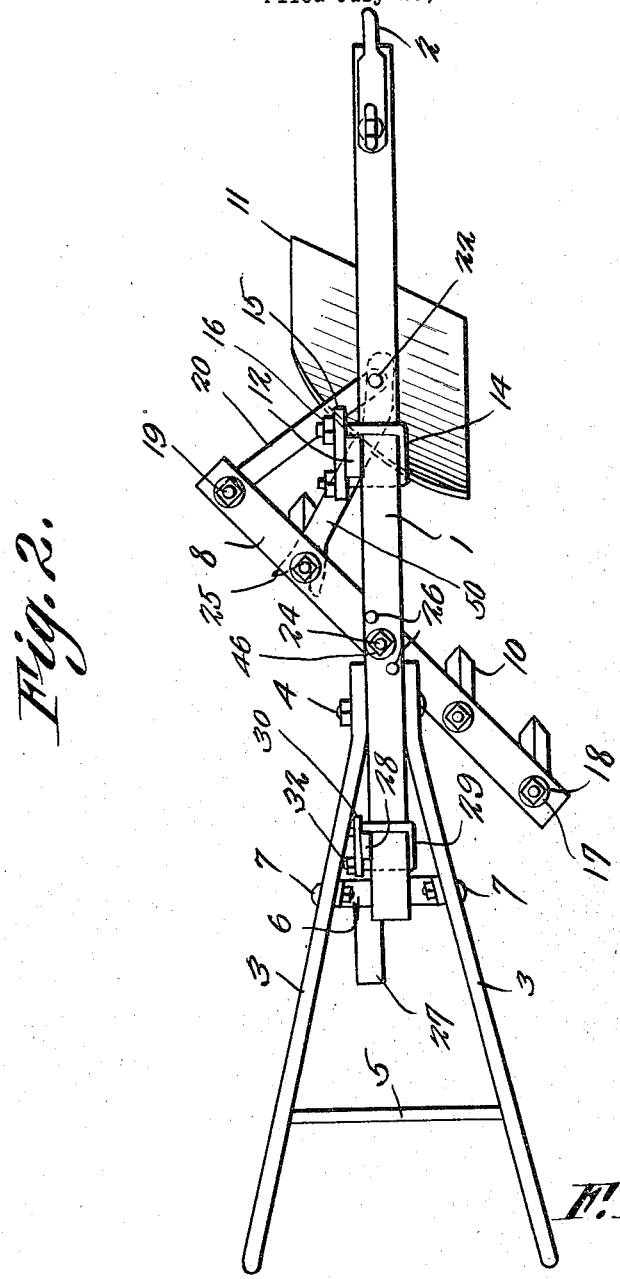

1,517,983

UNITED STATES PATENT OFFICE.

FREELAND THEADORE GRISHAM, OF TILLAR, ARKANSAS.

HARROW SCRAPER.

Application filed July 26, 1923. Serial No. 653,961.

*To all whom it may concern:*

Be it known that I, FREELAND T. GRISHAM, a citizen of the United States, residing at Tillar, in the county of Drew and State of Arkansas, have invented a new and useful Harrow Scraper, of which the following is a specification.

This invention aims to provide novel means whereby a turning plow share may be assembled with a cultivator. Another object of the invention is to provide novel means whereby the heel slide may be mounted on the plow beam and be adjusted readily thereon. A further object of the invention is to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in side elevation, a device constructed in accordance with the invention; Figure 2 is a top plan.

In the drawings there is shown a cultivator comprising a main beam 1 provided at its forward end with draft means 2 of any desired sort. Handles 3 are secured at 4 to the beam 1 and are connected by a rung 5, braces 6 being secured at 7 to the handles 3 and the main beam 1. An auxiliary beam 8 is disposed at an acute angle to the main beam 1, the beams 1 and 8 being notched together, as at 9 at their point of crossing, the beams being connected by bolts 26 and nuts 21. Harrow teeth 10 are shown, and include shanks 17 passing upwardly through the auxiliary beam 8, there being shoulders 23 at the lower ends of the shanks, one of the shanks being designated specifically by the numeral 24, because this shank has a double function which will be made manifest hereinafter. Nuts 18 are threaded on the upper ends of the shanks 17 of the teeth 10 and cooperate with the auxiliary beam 8.

The numeral 11 denotes the blade of a turning plow, located in advance of the teeth 10, the blade being carried by a standard 12 extended transversely of the main beam 1 and held thereon by a U-bolt 14, a yoke 15 and nuts 16. The forward end of a brace 20 is secured at 22 to the beam 1, in advance of a yoke 15 and is held on the beam 8 by a bolt 19 which replaces one tooth of the harrow. The numeral 50 marks a brace, the forward end of which is connected to the standard 12 behind the plow share 11, the brace 50 terminating in a fork 25, so inclined as to extend beneath the auxiliary beam 8, the fork straddling the shank 17 of one tooth and being bound between the corresponding shoulder 23 and the beam 8. The shank 24 of one of the teeth 10 passes upwardly, not only through the beam 8, but, as well, through the beam 1, and a nut 46 on the upper end of the shank 24 coacting with the beam 1 renders the shank 24 effective as a means for securing the cross beam 8.

The numeral 27 marks a substantially horizontal heel slide which limits and regulates the amount that the soil-engaging elements penetrate the ground, the heel slide including a standard 28 extended across the rear end portion of the beam 1 and held thereon, to permit a vertical adjustment of the heel slide 27, by a U-bolt 29, a yoke 30 and nuts 32, the U-bolt 29 (like the U-bolt 14) extending about the main beam 1.

One of the specific virtues of the implement arises out of the ease with which the plow share 11 may be assembled with the frame work of the plow. The brace 50 is flexible enough to permit any reasonable vertical adjustment of the standard 2 and the brace may be bent to any desired shape. Further, owing to the presence of the U-bolt 29, the yoke 30 and the nuts 32, the heel slide 27 may be adjusted vertically to regulate the amount that the soil engaging elements extend into the ground.

What is claimed is:

1. In a device of the class described, a plow frame comprising angularly disposed main and auxiliary beams, teeth carried by the auxiliary beam, the teeth comprising shanks, one shank being extended through both beams, and another shank being extended through the auxiliary beam, a share located in advance of the teeth, a standard carrying the share, means for connecting the standard with the main beam, and a brace for the share, the rear end of the brace being mounted on said other shank.

2. A plow comprising a frame including angularly disposed main and auxiliary beams, each including shanks defining shoulders, one shank passing through both beams, and the other shank passing through the auxiliary beam, a share located in advance of the teeth, a standard carrying the share, means for securing the standard to the main beam, and a brace for the share, the brace terminating at its rear end in a fork, engaging said other shank, and located between the corresponding shoulder and the auxiliary beam.

In testimony that I claim the foregoing as my own, I have hereto affixed my signature in the presence of two witnesses.

FREELAND THEADORE GRISHAM.

Witnesses:
V. C. HARRELL,
R. L. BALLARD.